(12) United States Patent
Ottamalika et al.

(10) Patent No.: US 8,510,436 B2
(45) Date of Patent: *Aug. 13, 2013

(54) UTILIZING CAPTURED IP PACKETS TO DETERMINE OPERATIONS PERFORMED ON PACKETS BY A NETWORK DEVICE

(75) Inventors: Iqlas Maheen Ottamalika, San Jose, CA (US); David C. White, Jr., Durham, NC (US); Madhusudan Challa, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/234,091

(22) Filed: Sep. 15, 2011

(65) Prior Publication Data

US 2012/0005339 A1 Jan. 5, 2012

Related U.S. Application Data

(63) Continuation of application No. 11/441,566, filed on May 25, 2006, now Pat. No. 8,041,804.

(51) Int. Cl.
*G06F 11/32* (2006.01)
(52) U.S. Cl.
USPC .......................................... 709/224; 709/221
(58) Field of Classification Search
USPC ........................................ 709/221, 223–226
See application file for complete search history.

(56) References Cited

U.S. PATENT DOCUMENTS

| | | | |
|---|---|---|---|
| 5,640,394 A | 6/1997 | Schrier et al. | |
| 5,696,899 A | 12/1997 | Kalwitz | |
| 5,819,042 A | 10/1998 | Hansen | |
| 5,850,388 A | 12/1998 | Anderson et al. | |
| 6,137,782 A * | 10/2000 | Sharon et al. | 370/255 |
| 6,515,967 B1 | 2/2003 | Wei et al. | |
| 6,539,022 B1 | 3/2003 | Virgile | |
| 7,738,403 B2 | 6/2010 | Ottamalika et al. | |
| 7,810,041 B2 | 10/2010 | Rao et al. | |
| 8,041,804 B2 | 10/2011 | Ottamalika et al. | |
| 2002/0038379 A1 | 3/2002 | Sato et al. | |
| 2002/0071387 A1 | 6/2002 | Horiguchi et al. | |
| 2003/0005145 A1 | 1/2003 | Bullard | |
| 2003/0005146 A1 * | 1/2003 | Miller et al. | 709/238 |
| 2003/0091042 A1 | 5/2003 | Lor | |
| 2003/0187977 A1 | 10/2003 | Cranor et al. | |
| 2003/0236995 A1 | 12/2003 | Fretwell | |
| 2004/0047349 A1 | 3/2004 | Fujita et al. | |
| 2004/0103315 A1 | 5/2004 | Cooper et al. | |
| 2004/0114590 A1 | 6/2004 | Harris | |
| 2005/0099948 A1 * | 5/2005 | Wakumoto et al. | 370/236 |
| 2005/0169186 A1 | 8/2005 | Qiu et al. | |
| 2005/0190758 A1 | 9/2005 | Gai et al. | |
| 2005/0259587 A1 | 11/2005 | Wakumoto et al. | |
| 2006/0023638 A1 | 2/2006 | Monaco et al. | |
| 2006/0077964 A1 | 4/2006 | Wu et al. | |
| 2007/0002769 A1 * | 1/2007 | Matityahu et al. | 370/255 |

OTHER PUBLICATIONS

USPTO; Office Action for U.S. Appl. No. 11/338,096; mailed Mar. 23, 2009.

\* cited by examiner

*Primary Examiner* — Thai Nguyen

(57) ABSTRACT

Methods and systems for utilizing captured packets to determine the operations performed on packets by a network device are described. One or more packets are captured and forwarded through the network device. Operations performed on the captured IP packets are logged.

16 Claims, 6 Drawing Sheets

UTILIZING CAPTURED IP PACKETS TO DETERMINE OPERATIONS PERFORMED ON PACKETS BY A NETWORK DEVICE

RELATED APPLICATION

The U.S. patent application Ser. No. 11/338,096, filed Jan. 23, 2006, entitled "A METHOD FOR DETERMINING THE OPERATIONS PERFORMED ON PACKETS BY A NETWORK DEVICE," by Iqlas Ottamalika, David C. White, Jr., and Madhu Challa, assigned to the same assignee of the present Patent Application, is hereby incorporated by reference. This application is a continuation of U.S. patent application Ser. No. 11/441,566 filed May 25, 2006 now U.S. Pat. No. 8,041,804, titled "UTILIZING CAPTURED IP PACKETS TO DETERMINE OPERATIONS PERFORMED ON PACKETS BY A NETWORK DEVICE", the disclosure of which is incorporated herein by reference in its entirety.

TECHNICAL FIELD

Embodiments of the present invention pertain to a method of utilizing captured IP packets to determine the operations performed on packets by a network device.

BACKGROUND

For a variety of reasons, a packet en route to its destination often passes through one or more networking device(s). For example, for security purposes, a packet may pass through a firewall, a router, or an Intrusion Prevention System (IPS). Once a networking device has received the packet it may perform a series of operations and actions on the packet before determining whether the packet should be allowed to be transmitted or dropped. For example, a firewall that has received a packet may perform a series of operations on the packet to determine whether the packet is valid and safe before transmitting it out the egress (output) interface.

With conventional approaches, the operations performed on the packet cannot be efficiently determined. For example, one traditional approach to analyzing the operations performed on the packet is by examining associated logs (syslogs) and debugs. The limitation of current logs and debugs is that they do not apply to a single packet, but instead to an entire feature or protocol. Because of this, trying to determine the operations performed on a packet by examining associated logs and/or debugs requires correlation of the logs/debugs back to the specific packet. This is very time consuming and inefficient.

This inefficiency causes problems for different network related operations. In one example, this inefficiency causes problems for the security operations group. The security operations group is responsible for ensuring a network device meets a set of network security guidelines. In order to accomplish this, security operations analyze both network traffic that is destined for the network device and network traffic that passes through the network device.

With conventional approaches, the network device's configuration is analyzed to determine the security posture. Logs (syslog) are then scrutinized to validate that the network device is denying traffic that is denied in the configuration, and permitting traffic that is permitted in the configuration. However, this approach is inefficient and painstakingly slow.

In another example, the network operations group is negatively affected by the lack of an efficient way to determine the operations performed on a packet as well. Network operations group verifies network connectivity between network users and resources, e.g., servers. In essence, the network operations group analyzes connectivity issues and determines why a user is unable to access a resource. With conventional approaches, a member of the network operations group frequently has to spend a significant amount of time to determine the operations performed on packets in order to troubleshoot the connectivity issue.

Specifically, a member of the network operations group may first analyze all the operations taken on the packet. Subsequently, an attempt is made to determine which operation is causing the connectivity to fail. If a cause is determined, the network operations agent may need to match the operation with an associated entry in the configuration to enable, disable, or modify the behavior. However, if the configuration is large, this approach becomes difficult, time-consuming, and without detailed knowledge of the network device one cannot effectively perform the troubleshooting.

DETAILED DESCRIPTION OF THE DRAWINGS

Figure 1:
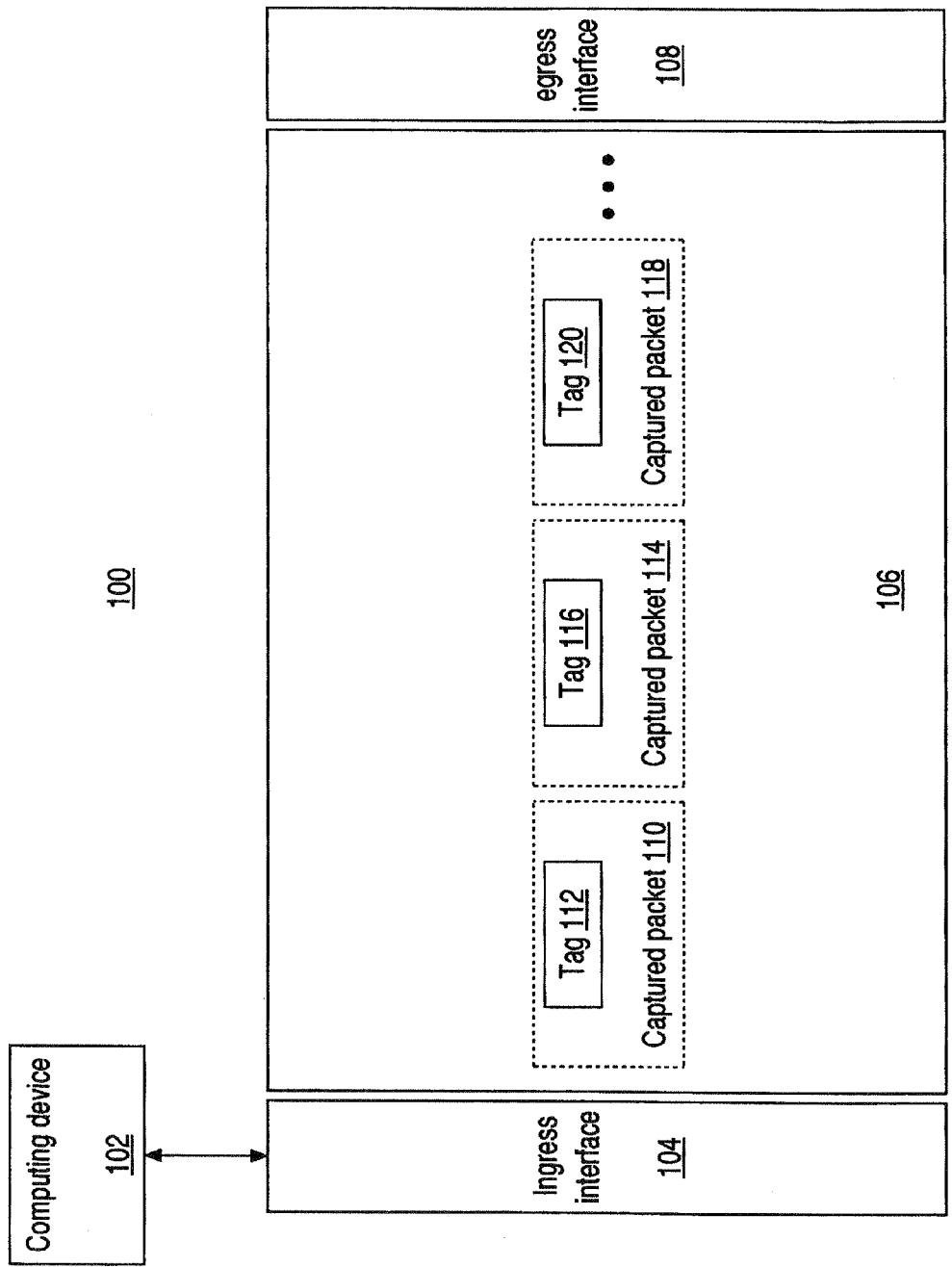
FIG. 1 illustrates a system for utilizing captured packets to determine the operations performed on packets by a network device, in accordance with an embodiment of the present claimed subject matter.

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which can be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter can be practiced without these specific details. In other instances, well known methods, procedures, components, and circuits have not been described in detail as not to unnecessarily obscure aspects of the claimed subject matter.

Under traditional approaches, it is often difficult to determine the operations taken on a packet. For example, scrutinizing logs (syslog) to validate if a network device is denying traffic that is denied in its corresponding configuration and permitting traffic that is permitted in the corresponding configuration is often time consuming and inefficient. Thus, an efficient way to determine the operations taken on a packet is desired.

One approach utilizes a simulated packet to determine operations taken on a packet. In one example, a simulated packet is input into a network device and the path taken by the simulated packet is recorded by adding tags to the simulated packet. Similarly, the operations performed on the simulated packet are recorded by adding additional tags indicating the operations performed. Further, if the simulated packet is dropped internally by an operation or has reached an egress interface and is ready to be transmitted, the tags are removed from the simulated packet and ordered for analysis. Upon removal, the tags are analyzed and the actions taken on the simulated packet are determined. However, although the simulated packet is an efficient way of determining operations taken on a packet in certain situations, it does not have the advantages provided by using one or more captured packets in other situations.

The present claimed subject matter focuses on utilizing one or more captured packets (e.g., captured Internet Protocol packets) to determine operations performed on packets by a network device (e.g., a router). In one embodiment, IP packets are captured and forwarded through the network device. Operations performed on the captured IP packets are logged. Different from using a simulated packet approach that require a user input key attributes of the simulated packet, the captured packet approach, in one example, automatically includes key attributes such as flags, Differentiated Services Code Point (DSCP) bits, and other Layer 5 (session layer) and Layer 4 (transport layer) header information.

Also, different from using a single simulated packet at a time, using captured packets means multiple packets can be sent at a time through a network device. As multiple data packets are needed in both directions to establish a TCP/IP session and pass data, captured packets may be easily adapted to establish and analyze TCP/IP sessions. Moreover, many TCP/IP related problems can only be debugged correctly if the stream of data packets is in order. In general, the simulated packets approach is unable to correctly debug TCP/IP issues. For example, with regards to diagnosing problems associated with the voice protocol context, TCP handshake context, FTP context, and/or HTTP web traffic context, multiple packets are needed for an effective evaluation.

In addition, a significant portion of Layer 7 (application layer) information is often needed for troubleshooting various protocols. For instance, information included in the control channel payload is of great importance to troubleshooting File Transfer Protocol (FTP). In general, captured packets include Layer 7 information and can be efficiently utilized in troubleshooting different protocols.

Furthermore, by utilizing a captured packets approach a client can capture the actual network traffic and save it in a 'pcap" or "tcpdump" format. Subsequently, the client can replay the network traffic to analyze what in fact has occurred.

Additionally, the captured packets approach can be used to compare devices. Although the simulated packet approach can also be utilized to evaluate the behavior of network devices, it may not provide the complexity of real network traffic. By taking the captured packets approach, a highly complicated network traffic pattern can be sent through a first device and the corresponding first output saved. Subsequently, the complicated traffic pattern can be sent through a second device and a corresponding second output saved. By comparing the first output to the second output, the behavior of the first device can be compared with the behavior of the second device. Thus, the captured data packet approach can be utilized as an efficient diagnostic tool.

FIG. 1 illustrates a system 100 for utilizing captured packets to determine the operations performed on packets by a network device, in accordance with an embodiment of the present claimed subject matter. System 100 includes computing device 102, ingress interface 104, network device 106, egress interface 108, captured packet 110, captured packet 114, captured packet 118, tag 112, tag 116, and tag 120. In one embodiment, computing device 102 is a command line interface station where a user can perform post processing of captured packets.

Also, although system 100 is shown and described as having certain numbers and types of elements, the present claimed subject matter is not so limited; that is, system 100 can include elements other than those shown, and can include more than one of the elements that are shown. For example, system 100 can include a greater or fewer number of captured packets than the three captured packets (captured packets 110, 114, and 118) shown. Also, system 100 can include a greater number of tags in each of the captured packets. In one embodiment, captured packet 110 has other tags (not shown) in addition to tag 112. Also, in one embodiment, the captured packets include key attributes such as flags, Differentiated Services Code Point (DSCP) bits, Layer 5 header information, and Layer 4 header information.

In one embodiment, captured packets 110, 114, and 118 are sent through network device 106 and are utilized to trace the operations and actions taken on a packet as it passes through a network device. In one example, the captured packets 110, 114, and 118 are packets that were captured at an earlier point in time at the ingress interface. The captured packets 110, 114, and 118 are inputted into network device 106 via ingress interface 104 of network device 106. Network device 106 can be a firewall, a switch, a router, an Intrusion Prevention System (IPS), other types of network security devices, and/or other compatible devices.

Captured packets 110, 114, and 118 travels through the same processing paths of network device 106 as if it were packets of normal network traffic. However, in contrast to packets of normal network traffic, if operations are performed on the captured packets 110, 114, and 118, tags, such as tags 112, 116, and 120, are added to the captured packets 110, 114, and 118 to indicate the operation. In one example, multiple tags are added to each of the captured packets 110, 114, and 118 to record different operations performed on the captured packets. Similarly, the path (e.g., data path) taken by captured packets 110, 114, and 118 are indicated by additional tags.

Upon reaching either an egress interface, e.g., egress interface 108, of the network device 106 or being dropped internally by an operation, a captured packet (e.g., captured packet 114) is removed from its path. In one example, the tags, such as tag 116, are removed, ordered for processing, and analyzed to determine the actions and operations taken on the dropped packet (e.g., captured packet 114). In another example, the tags, such as tag 116, are saved with the captured packet (e.g., captured packet 114). In one embodiment, upon removal of the captured packet 114 from the data plane, actions taken on the captured packet 114 is presented to a user with the corresponding line in the configuration information that represents the given action. An action/operation taken on the captured packet 114 can be an ingress access filter operation, a route lookup operation, a network address translation (NAT) operation, an authentication and/or authorization operation, an advanced protocol filter operation, a quality of service operation, an encryption and/or decryption operation, a tunneling operation, an egress access filter, an egress interface, and/or a final action to transmit or drop operation.

Figure 2:
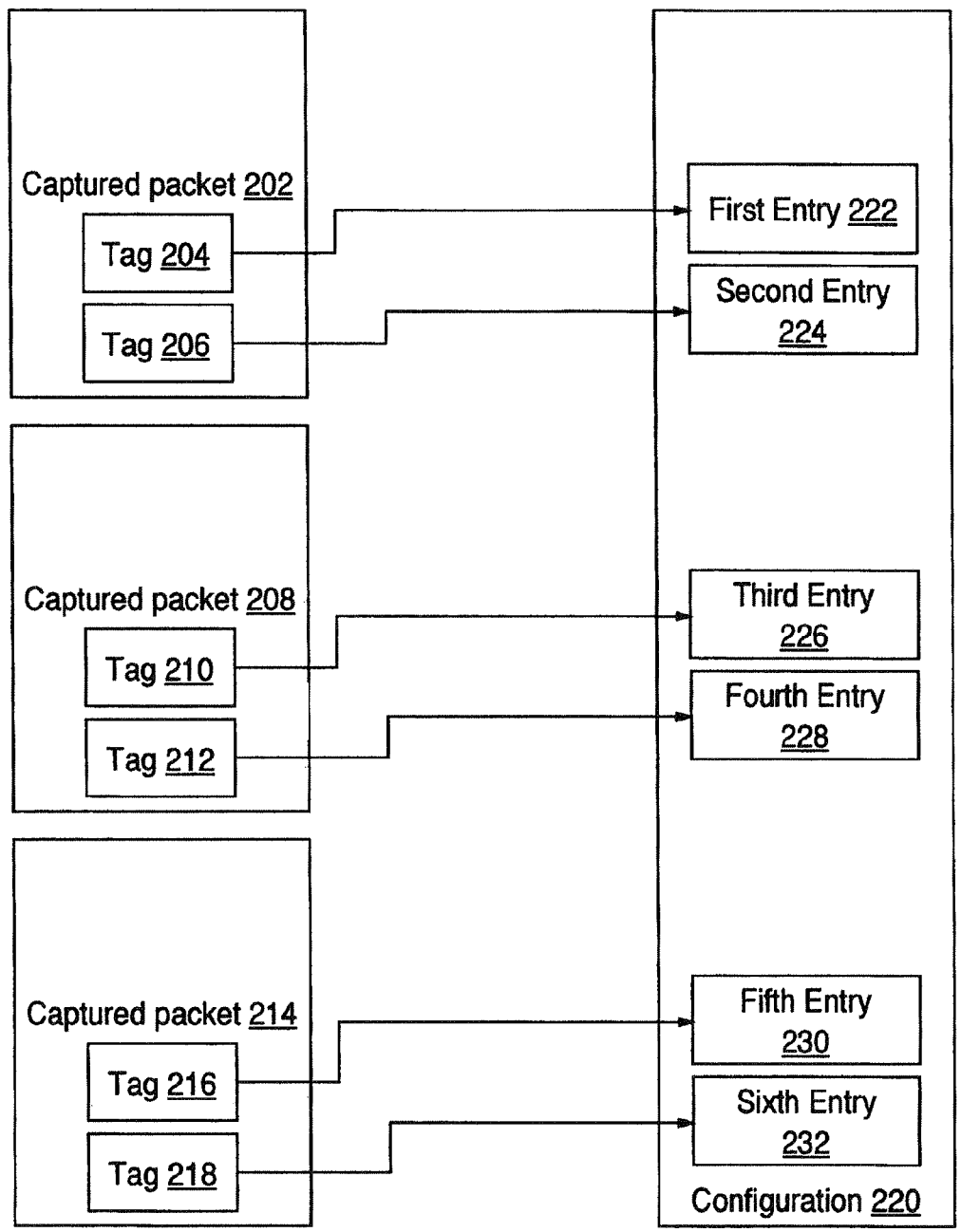
FIG. 2 illustrates a block diagram of tags of captured packets being analyzed and correlated to configuration information, in accordance with an embodiment of the present claimed subject matter.

FIG. 2 illustrates a block diagram of captured packets 202, 208, and 214 being analyzed, in accordance with an embodiment of the present claimed subject matter. Captured packet 202 includes tags 204 and 206. Captured packet 208 includes tags 210 and 212. Captured packet 214 includes tag 216 and 218. Also, configuration information 220 includes first entry 222, second entry 224, third entry 226, fourth entry 228, fifth entry 230, and sixth entry 232.

Also, although captured packets 202, 208, 214, and configuration information 220 are shown and described as having certain numbers and types of elements, the present claimed subject matter is not so limited; that is, captured packets 202, 208, 214, and configuration information 220 can include elements other than those shown, and can include more than one of the elements that are shown. In one example, captured packet 202 can include a greater or fewer number of tags than the two tags (tags 204 and 206) shown. In another example, configuration information 220 can include a greater or fewer number of entries than the six entries (first entry 222, second entry 224, third entry 226, fourth entry 228, fifth entry 230, and sixth entry 232) shown.

Once a captured packet, such as captured packet 202, is removed from its path, the associated tags, such as tags 204 and 206, in one embodiment, are saved with the captured packet (e.g., captured packet 202) and analyzed to determine the operations performed on the captured packet (e.g., captured packet 202). In one example, all actions performed on the captured packet 202 are recorded. The actions correlated directly to specific lines in the configuration information. Thus, a user can see the actions taken on captured packet 202 by a network device. Also, a user is informed which part of the configuration information needs to be modified to change an action.

In the present embodiment, tag 204 and tag 206 indicate the operations performed on the captured packets 202 and are removed. Upon removal, the operations indicated by tags 204 and 206 are correlated with its corresponding entries, e.g., first entry 222 and second entry 224, in the configuration information.

Specifically, the operation indicated in tag 204 is correlated to first entry 222 of configuration information 220 and the operation indicated in tag 206 is correlated to second entry 224 of configuration information 220. Once the process of correlation is complete, the results may be displayed to a user. Although in the present embodiment a tag only corresponds to one operation, the present claimed subject matter is not so limited. In other embodiments, a tag may indicate several separate operations performed on a captured packet (e.g., captured packet 202).

Similarly, tags 210 and 212 of captured packet 208 are correlated to third entry 226 and fourth entry 228 respectively. In the same way, tags 216 and 218 are correlated to fifth entry 230 and sixth entry 232. In one example, a captured packet, such as captured packet 208, can have more than two associated tags. Also, one or more tags may be correlated to the same entry of configuration information 220.

By automatically correlating operations to its associated entries in the configuration information, a user can easily match actions taken on captured packets (e.g., captured packets 202, 208, and 214) to the corresponding configuration.

Thus, the present claimed subject matter allows a more time effective way for debugging, troubleshooting, or verification of configuration rules.

Figure 3:
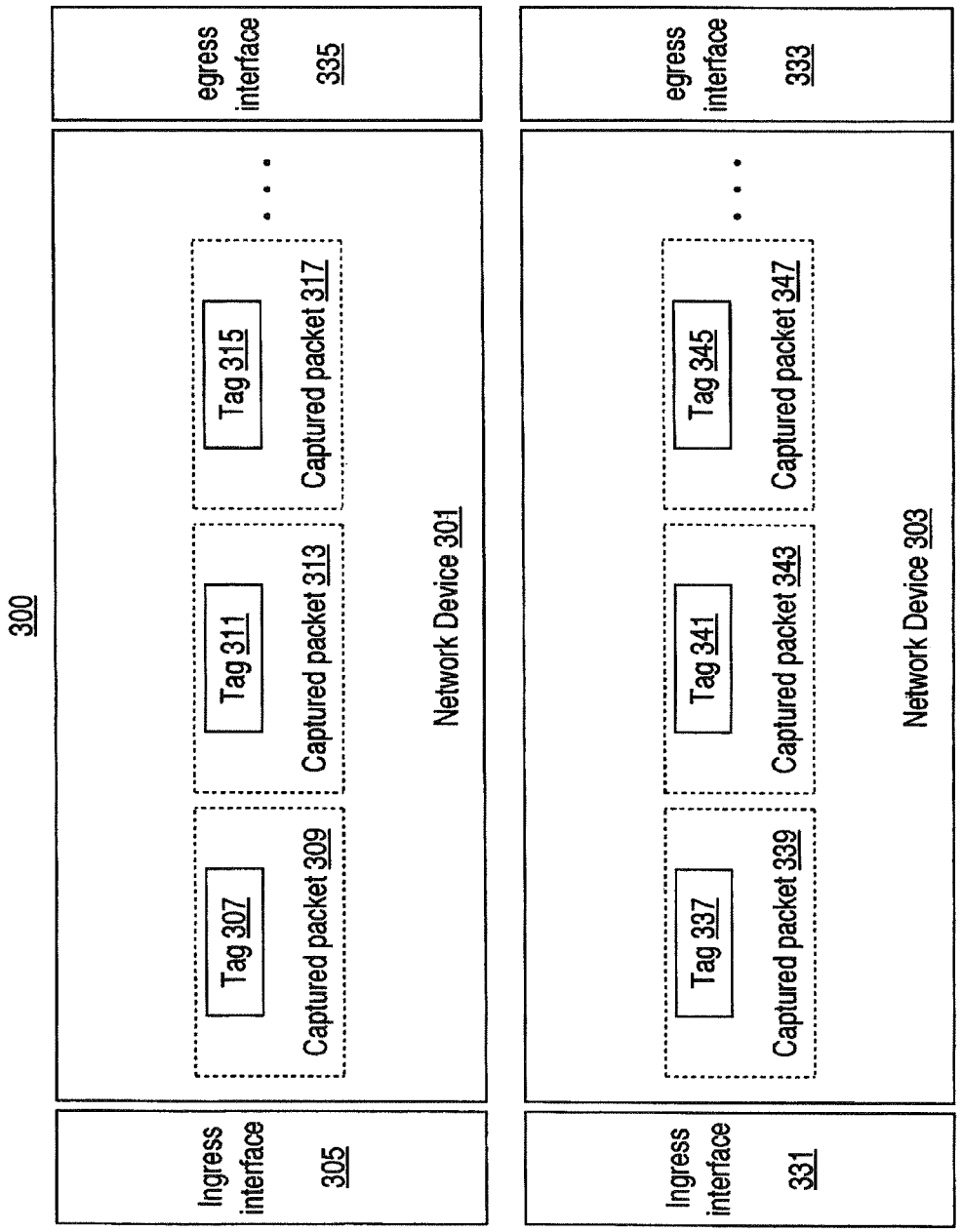
FIG. 3 illustrates a system of utilizing captured packets to compare network devices.

FIG. 3 illustrates a system 300 of utilizing captured packets to compare network devices. System 300 includes network device 301 and network device 303. Network device 301 includes ingress interface 305 and egress interface 335. Network device 303 includes ingress interface 331 and egress interface 333.

In the present embodiment, a network traffic pattern (e.g., captured packet 309 with tag 307, captured packet 313 with tag 311, and captured packet 317 with tag 315) is sent through network device 301. Also, captured packet 339 with tag 337, captured packet 343 with tag 341, and captured packet 347 with tag 345, represents the same network traffic pattern and is sent through network device 303. Although network traffic pattern is shown and described, in one example, as including captured packets 309, 313, and 317, the claimed subject matter is not so limited. In another embodiment, the network traffic pattern is more complex.

A corresponding first output from the network device 301 is saved. Also, a corresponding second output from the network device 303 is saved. The first output is compared with the second output to contrast the behavior of network device 301 with network device 303. Accordingly, captured packets (e.g., captured Internet Protocol packets) may be utilized as an efficient diagnostic tool.

Figure 4:
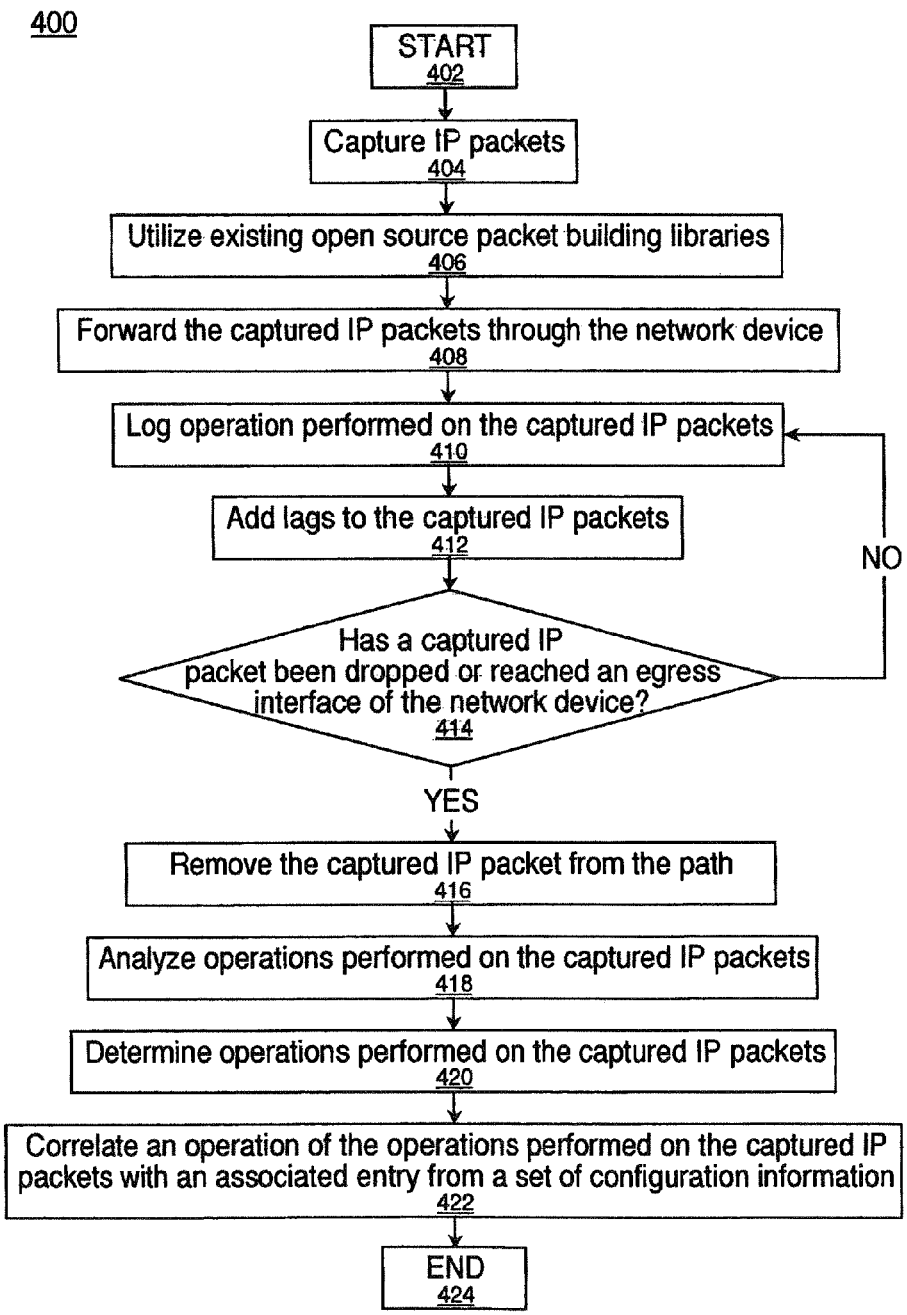
FIG. 4 illustrates a flowchart of a method for utilizing captured packets to determine the operations performed on packets by a network device upon which embodiments in accordance with the present claimed subject matter can be implemented.

FIG. 4 illustrates a flowchart 400 of a method for utilizing captured packets to determine the operations performed on packets by a network device upon which embodiments in accordance with the present claimed subject matter can be implemented. Although specific steps are disclosed in flowchart 400, such steps are exemplary. That is, embodiments of the present claimed subject matter are well suited to performing various other or additional steps or variations of the steps recited in flowchart 400. It is appreciated that the steps in flowchart 400 can be performed in an order different than presented.

At block 402, the process starts. At block 404, IP packets are captured. In one embodiment, the captured IP packets form a complex network traffic pattern suitable for diagnosing the behavior pattern of a network device.

At block 406, existing open source packet building libraries are utilized. In one embodiment, the open source packet building libraries run on hosts connected to the network device (e.g., a firewall).

At block 408, the captured IP packets forming a network traffic pattern are forwarded through the network device (e.g., a router). In one embodiment, the captured IP packets are injected into the ingress interface of the network device. Also, a network device can be a firewall, a router, an Intrusion Prevention System (IPS), a network security device, and/or other compatible network devices.

At block 410, operations performed on the captured IP packets are logged as the captured IP packets featuring the network traffic pattern pass through a network device. At block 412, tags are added to the captured IP packets. In one embodiment, an operation performed on the captured IP packets is logged by adding a tag indicating the operation onto the captured IP packet. In one embodiment, a plurality of tags is added to a captured IP packet to indicate a corresponding plurality of operations performed. In one embodiment, a tag indicates a plurality of operations taken on the captured IP packet. Also, in one embodiment, the path (e.g., data path) taken by the captured IP packet is traced. In one embodiment, the path taken by the captured IP packet is traced by adding tags indicating the path taken by the captured IP packet.

At block 414, it is determined whether a captured IP packet has been dropped or has reached an egress interface of the network device. Determining whether a captured IP packet has been dropped or has reached an egress interface of the network device can be implemented in a variety of ways. In one embodiment, a processor determines whether a captured IP packet has been dropped or has reached an egress interface of the network device. If it is determined that a captured IP packet has not been dropped or has not reached an egress interface of the network device, then operations performed on the captured IP packet continues to be logged.

At block 416, if the captured IP packet has been dropped internally or has reached an egress interface of the network device, then the captured IP packet is removed from the data path. In one embodiment, removal is implemented by deleting the captured IP packet. In another embodiment, removal is implemented by directing the captured IP packet away from its prior path. Also, removal can be immediate or time-delayed.

At block 418, operations performed on the captured IP packets are analyzed. In one embodiment, the tags from the captured IP packet are removed in order, and analyzed to determine the actions taken on the captured IP packet. In one embodiment; a user uses a command line interface (CLI) to perform post processing of the tags.

At block 420, the operations performed on the captured IP packets are determined. At block 422, an operation of the operations performed on the captured IP packets is correlated with an associated entry from a set of configuration information. In one embodiment, each tag is automatically correlated with its associated entry from the configuration information. In one embodiment, operations performed on the IP packets and associated configuration information is displayed to a user. At block 424, the process ends.

Accordingly, embodiments offer effective methods for a user to trace actions performed on packets without having to manually fabricate a packet. By utilizing captured packets and a light weight trace technique, the performance of the network device is negligibly impacted. Moreover, embodiments allow tagging of a time line of the life of packets in various modules, which allow a real time profile of network traffic through network devices. Consequently, embodiments can be utilized to debug modules that take a long time in processing packets.

Figure 5:
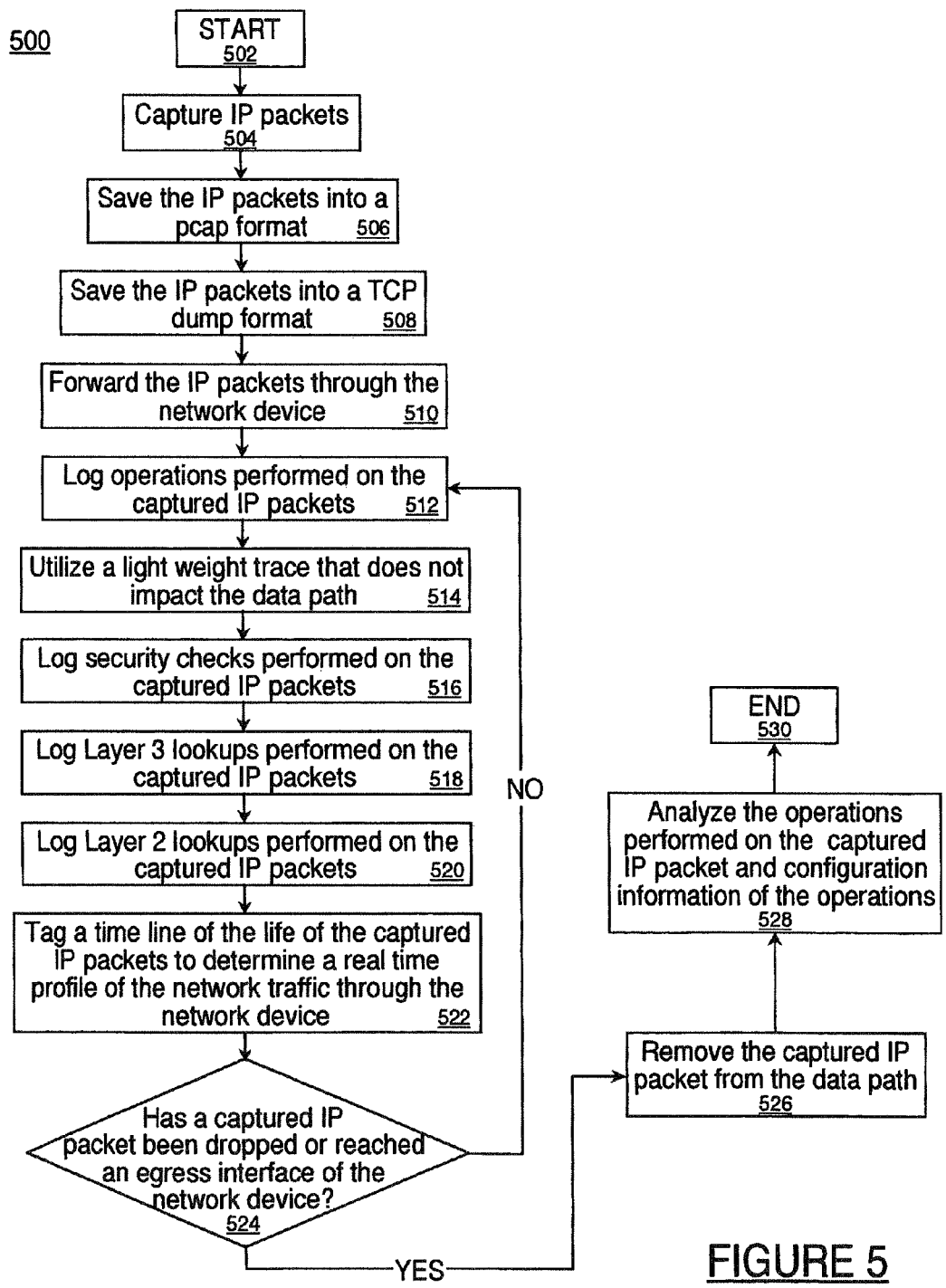
FIG. 5 illustrates a flowchart of a method for applying a light weight trace on captured packets to determine the operations performed on packets by a network device upon which embodiments in accordance with the present claimed subject matter can be implemented.

FIG. 5 illustrates a flowchart 500 of a method for applying a light weight trace on captured packets to determine the operations performed on packets by a network device (e.g., a switch) upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented.

At block 502, the process starts. At block 504, IP packets are captured. In one embodiment, the captured IP packets includes key attributes such as flags, Differentiated Services Code Point (DSCP) bits, and other Layer 5 (session layer) and Layer 4 (transport layer) header information.

At block 506, the IP packets are saved in a pcap (packet capture) format. At block 508, the captured IP packets are saved in a TCP dump format. In one embodiment, the IP packets are saved onto a non-volatile memory, such as Read-Only Memory (ROM), flash memory, hard disks, floppy disks, magnetic tapes, optical disk drives, and Magnetic Random Access Memory (MRAM). In another embodiment, the captured packets are saved onto a volatile memory, such as Random Access Memory (RAM), Dynamic Random Access Memory (DRAM), Static Random Access Memory (SRAM), Content Addressable Memory, dual-ported RAM, and/or other types volatile memory.

At block 510, the captured IP packets are forwarded through the network device. In one embodiment, the captured IP packets are injected into the ingress interface of the network device. Also, a network device can be a firewall, a router, an Intrusion Prevention System (IPS), a network security device, and/or other compatible network devices.

At block 512, operations performed on the captured IP packets are logged. In one embodiment, one or more tags are added to each of the captured IP packets to trace actions taken and/or operations performed on the captured IP packets. In one embodiment, each tag on the captured IP packet is subsequently correlated to an entry in configuration information.

At block 514, a light weight trace is utilized. In one embodiment, the light weight trace does not impact the data path and does not appreciably impact the performance of the network device. Hence, unlike conventional packet tracers, embodiments allow a user to analyze a network device without negatively impacting the proper functioning of the network device.

At block 516, security checks performed on the IP packets are logged. In one embodiment, every security check performed on a captured UP packet is recorded. At block 518, Layer 3 (transport layer) lookups on the captured IP packets are performed. At block 520, Layer 2 (data link layer) lookups on the captured IP packets are performed.

At block 522, a time line of the life of the captured IP packet is tagged to determine a real time profile of the network traffic through the network device. In one embodiment, time lines of the life of packets in various modules are tagged, which allow a real time profile of network traffic through network devices. Accordingly, embodiments can be utilized to debug modules that take a long time in processing packets.

At block 524, it is determined whether a captured IP packet has been dropped or has reached an egress interface of the network device (e.g., a firewall).

At block 526, if the captured IP packet has been dropped internally or has reached an egress interface of the network device, then the captured IP packet is removed from the data path. In one embodiment, the removal is immediate. In another embodiment, the removal is time-delayed.

At block 528, operations performed on the captured IP packets are analyzed. In one embodiment, analysis of the operations performed on the captured IP packets takes place at a command line interface (CLI) station. In one embodiment, the analysis includes post processing of the trace buffer. In one embodiment, an operation of the operations performed on the captured IP packets is correlated with an associated entry from a set of configuration information. In one embodiment, each tag is automatically correlated with its associated entry from the configuration information. In one embodiment, operations performed on the IP packets and associated configuration information is displayed to a user. At block 530, the process ends. Accordingly, the present invention allows a more time effective way for debugging, troubleshooting, or verification of configuration rules.

Figure 6:
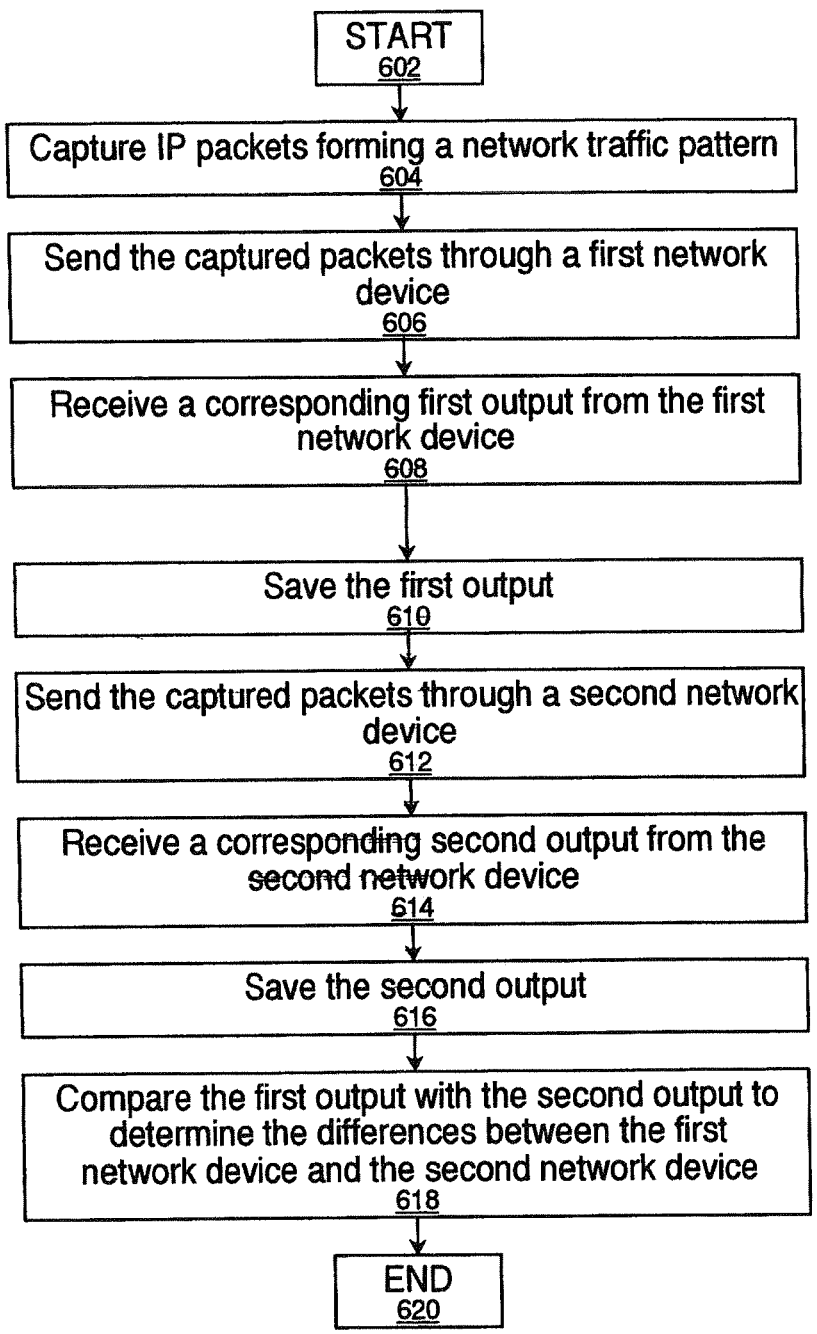
FIG. 6 illustrates a flowchart of a method for utilizing captured packets to compare the behavior pattern of network devices upon which embodiments in accordance with the present claimed subject matter can be implemented.

FIG. 6 illustrates a flowchart 600 of a method for utilizing captured packets to compare the behavior pattern of network devices upon which embodiments in accordance with the present claimed subject matter can be implemented. Although specific steps are disclosed in flowchart 600, such steps are exemplary. That is, embodiments of the present claimed subject matter are well suited to performing various other or additional steps or variations of the steps recited in flowchart 600. It is appreciated that the steps in flowchart 600 can be performed in an order different than presented.

At block 602, the process starts. At block 604, IP packets forming a network traffic pattern are captured. In one embodiment, the network traffic pattern is highly complex. With the simulated packet approach, it may be inefficient for a user to manually define a network traffic pattern of equal complexity. Thus, the captured IP packets approach allow a more effective means for obtaining a complex network traffic pattern.

At block, 606, the captured packets are sent through a first network device. The network device can be a router, a firewall, and/or an Intrusion Prevention Device. At block 608, a corresponding first output from the first network device is received. At block 610, the first output is saved.

At block 612, the captured packets are sent through a second network device. At block 614, a corresponding second output is received from the second network device. At block 616, the second output is saved. Although in the present embodiment the captured packets are sent through a first network device and a second network device, the claimed subject matter is not so limited. The captured packets can be sent through any number of network devices in order to compare the behavior patterns of network devices.

At block 618, the first output is compared with the second output to determine the differences between the first network device and the second network device. At block 620, the process ends. Accordingly, embodiments allow a complicated network traffic pattern to be sent through different devices in order to compare the behavior patterns between the different devices.

Thus, embodiments set forth examples of using captured packets to determine the operations performed on packets by a network device. Because captured packets include payload information (e.g., layer 7 application level information), it can be utilized to perform effective troubleshooting where the information included in the payload is of appreciable significance (e.g., in the FTP context). Moreover, a number of TCP/IP related problems can only be debugged properly if the stream of data packets used for diagnosis is in order. By using captured packets, the entire stream can, in one example, be replayed in order. Further, embodiments provide an effective way to match actions taken on a captured IP packet with its associated configuration information. In one example, embodiments set forth a pro-active tool that allows network operators to verify configuration information. In another example, embodiments enable security operators to efficiently verify that a network device is denying traffic that is denied in the configuration, and permitting traffic that is permitted in the configuration.

In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable medium having stored thereon computer-executable instructions that configure a processing device for:

injecting one or more captured IP packets through an ingress point of network device in communication with the processing device, wherein the one or more captured IP packets include transport layer data, application layer data or session layer data, or combinations thereof in header information;

logging operations performed on the one or more captured IP packets wherein the logging comprises adding one or more tags to the one or more captured IP packets, wherein each tag of the one or more tags indicates at least one operation performed on the one or more captured IP packets by the network device;

determining the at least one operation performed on the one or more captured IP packets by inspecting corresponding tags;

correlating network device configuration information corresponding to a network device configuration for the network device with the at least one operation performed on the one or more captured IP packets, wherein the at least one operation performed each map to one or more corresponding lines in a configuration file.

2. The non-transitory computer-readable medium of claim 1, wherein the header information comprises one or more flags.

3. The non-transitory computer-readable medium of claim 1, wherein the header information comprises one or more Differentiated Services Code Point (DSCP) bits.

4. The non-transitory computer-readable medium of claim 1, wherein the header information comprises debugging information.

5. The non-transitory computer-readable medium of claim 1, wherein the one or more captured IP packets includes a control channel payload.

6. An apparatus comprising:
one or more processors configured to:
capture one or more Internet Protocol (IP) packets at an ingress point of a first network device;
propagate the one or more captured IP packets through the first network device;
log one or more first operations performed on the one or more captured IP packets, wherein the logging of the one or more first operations comprises adding one or more tags to the one or more captured IP packets wherein each tag indicates an operation performed by the first network device;
propagate the one or more captured IP packets through a second network device;
log one or more second operations performed on the one or more captured IP packets, wherein the logging of the one or more second operations comprises adding one or more tags to the one or more captured IP packets to indicate operations performed on the one or more captured IP packets by the second network device;
identify the one or more first operations and the one or more second operations;
determine operational patterns of the first and second network devices by comparing the one or more first operations of the first network device with the one or more second operations of the second network device on the one or more captured IP packets; and
execute troubleshooting or debugging, or combinations thereof based on payload data and a determination of the operational patterns of the first and second network devices.

7. The apparatus of claim 6, wherein the one or more processors are further configured to:

receive a corresponding first output report from the first network device comprising descriptions of one or more actions performed on the one or more captured IP packets, the one or more actions mapping to one or more corresponding lines in a configuration file; and receive a corresponding second output from the second network device.

8. The apparatus of claim 7, wherein the one or more processors are further configured to display the one or more first operations and one or more second operations mapped to corresponding lines of configuration data to confirm configuration compliance.

9. The apparatus of claim 6, wherein the one or more processors are further configured to save the one or more tags with the one or more captured IP packets.

10. The apparatus of claim 6, wherein the one or more first operations and one or more second operations comprise an ingress access filter operation, a route lookup operation, a network address translation (NAT) operation, an authentication operations, an authorization operation, an advanced protocol filter operation, a quality of service operation, an encryption operations, a decryption operation, a tunneling operation, an egress access filter, an egress interface, a final action to transmit or drop operation, or combinations thereof.

11. The apparatus of claim 6, wherein the one or more processors are further configured to correlate the identified one or more first operations and one or more second operations with specific lines in configuration information.

12. The apparatus of claim 11, wherein the one or more processors are further configured to display the specific lines in the configuration information and identify a repair section of the configuration information to modify to alter the identified one or more first operations and one or more second operations.

13. The apparatus of claim 6, wherein a tag of the one or more tags indicates a plurality of operations taken on the one or more captured IP packets.

14. The apparatus of claim 11, wherein the one or more processors are further configured to propagate the one or more captured IP packets through the first and second network devices in order of occurrence in a traffic stream.

15. The apparatus of claim 11, wherein the one or more processors are further configured to utilize a light weight trace to log the one or more first operations.

16. The apparatus of claim 11, wherein the one or more processors are further configured to utilize a light weight trace to log the one or more second operations.

* * * * *